UNITED STATES PATENT OFFICE.

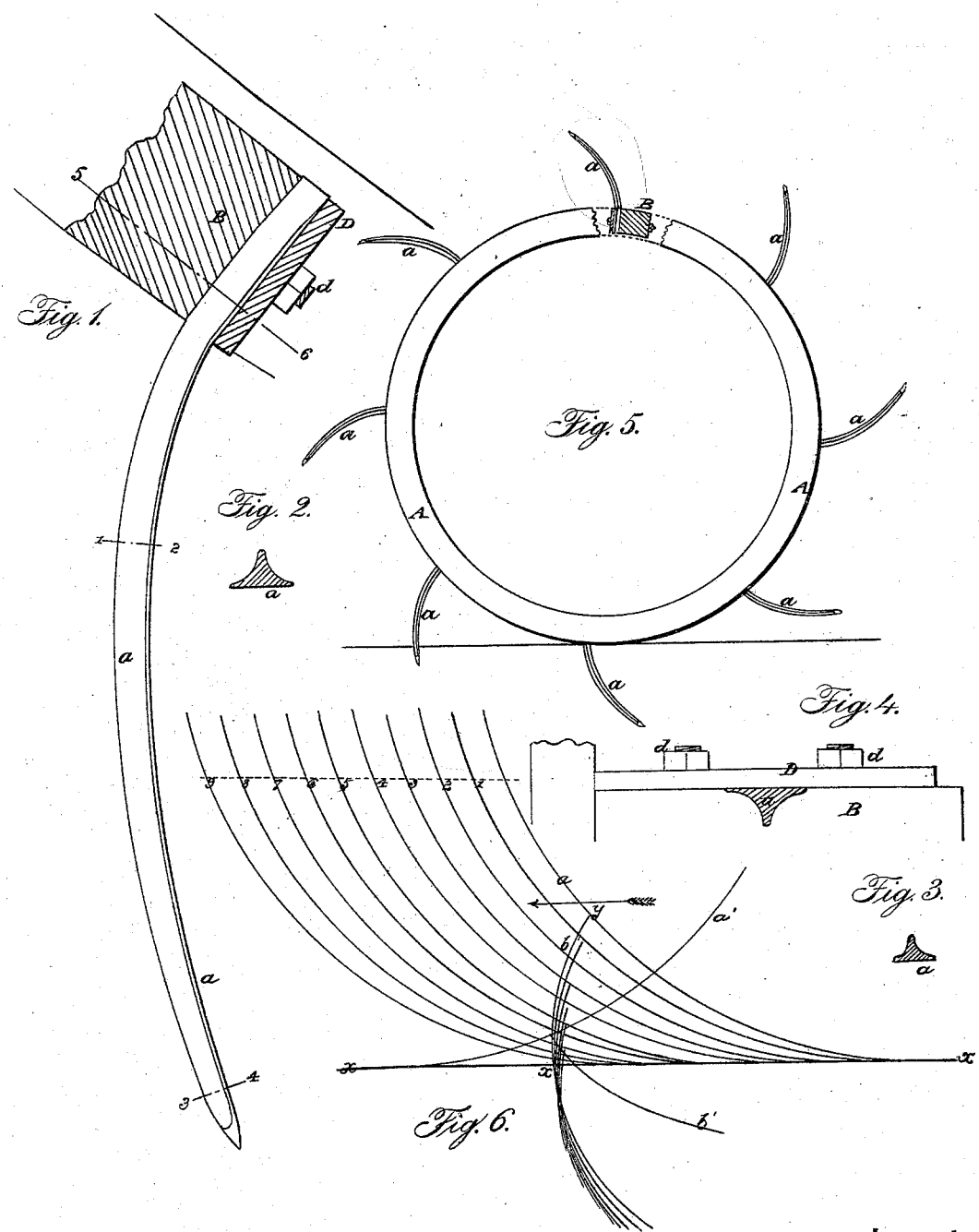

W. F. QUINBY AND GEORGE G. LOBDELL, OF WILMINGTON, DELAWARE.

IMPROVEMENT IN ROTARY DIGGERS.

Specification forming part of Letters Patent No. 58,289, dated September 25, 1866; antedated September 10, 1866.

*To all whom it may concern:*

Be it known that we, W. F. QUINBY and G. G. LOBDELL, of Wilmington, New Castle county, Delaware, have invented an Improvement in Rotary Diggers; and we do hereby declare the following to be a full, clear, and exact description of the same, reference being had to the accompanying drawings, and to the letters of reference marked thereon.

Our invention consists in the use, in rotary diggers, of teeth bent to the peculiar curve fully described hereinafter, so that they may penetrate the soil without dragging the same, and so that on leaving the soil they may turn it up abruptly, the action of the teeth being similar to that of a spade in the hands of a gardener.

Our invention further consists in making the teeth of a form described hereinafter, so as to insure strength, easy penetration of the soil, and the turning up of the same with the best effect.

Our invention further consists in the manner fully described hereinafter of securing the teeth to the cylinder of the digger.

In order to enable others skilled in the art to make and use our invention, we will now proceed to describe its construction and operation.

On reference to the accompanying drawings, which form a part of this specification—

Figure 1 is a full-sized representation of our improved teeth for rotary diggers; Fig. 2, a transverse section on the line 1 2, Fig. 1; Fig. 3, a transverse section of the tooth on the line 3 4, Fig. 1; Fig. 4, a section on the line 5 6, Fig. 1. Fig. 5 represents the rim of the digger-wheel with its teeth all drawn to a reduced scale; and Fig. 6, a diagram illustrating our invention.

Similar letters refer to similar parts throughout the several views.

As our invention is limited to the teeth of a rotary digger, it has not been deemed necessary to show more than one rim, A, of the cylinder, Fig. 5, which is composed of two or more of these rims, connected together by cross-bars B, to which the teeth are secured.

The teeth are bent to a peculiar curve, the character of which we will now proceed to describe.

In the diagram, Fig. 6, the line *a* represents a portion of the outer circumference of the cylinder, the curved line *b* representing one of the teeth, the point of which is about entering the ground, (represented by the horizontal line X) at *x*.

As the cylinder is drawn over the ground in the direction of the arrow, the tooth will penetrate the soil; but it is of such a peculiar curve that, as the cylinder moves and its circumference assumes the several progressive positions illustrated by the red lines 1 2 3, &c., and as the tooth penetrates the soil, it continues to coincide with the point *x* (the first point of penetration) until the point *y*, where the tooth meets the circumference *a* of the cylinder, coincides with the said point *x*, or, in other words, until the entire tooth has penetrated the soil.

It will be seen, therefore, that as the tooth penetrates the soil there is no drag on the latter, the tooth passing into the soil precisely as does an ordinary spade in the hands of a gardener preparatory to the raising of a portion of the soil in front of the spade.

The effect of the tooth on the soil as it leaves the same differs entirely from its action on penetrating the soil, for after the penetration of the entire tooth, and on the continued forward movement of the cylinder, the tooth immediately commences to raise the soil abruptly, precisely as a gardener raises the soil in front of his spade after the latter has been inserted to the desired depth.

This action of the tooth will be readily understood on reference to the red lines *a'* and *b'* in the diagram, Fig. 6, the line *b'* representing the tooth as it is passing upward out of the ground, and the line *a'* representing part of the circumference of the cylinder.

The exact curve of the tooth will depend upon its length and the diameter of the cylinder to which it is attached. These having been determined on, any one familiar with the construction of machinery and mechanical drawing can readily produce the desired curve on reference to the diagram, Fig. 6, and the above-described description of the same.

On reference to the full-sized views, Figs. 1, 2, and 3, it will be seen that the tooth *a* has a sectional form similar to that of a bayonet—that is, flat in front and ribbed on the back— a form which possesses three advantages: first, it insures strength in the right direction; second, it is the best form to insure an easy penetration of the tooth into the ground; third, the tooth being flat and broadest in front, it will turn up the soil with the best effect.

Fig. 4 illustrates the manner of securing the teeth to the cross-bars of the cylinder.

A recess is cut in the cross-bar of a form adapted to the back of the tooth, and against the front of the latter a plate, D, is secured by bolts $d\ d$, after loosening the nuts of which the tooth can be withdrawn for repairs or to make way for a new tooth.

We claim as our invention and desire to secure by Letters Patent—

1. The use in rotary diggers of teeth bent to the curve described, for the purpose specified.

2. The curved tooth $a$, having the sectional form described, for the purpose set forth.

3. The tooth $a$, adapted to a groove in the cross-bar B, and secured thereto by a plate, D, as and for the purpose herein specified.

In testimony whereof we have signed our names to this specification in the presence of two subscribing witnesses.

W. F. QUINBY.
GEORGE G. LOBDELL.

Witnesses:
ROBT. GALBREATH,
JOHN CURRY.